US008862698B2

(12) United States Patent
Sukhyy

(10) Patent No.: US 8,862,698 B2
(45) Date of Patent: Oct. 14, 2014

(54) METHOD AND SYSTEM FOR AUTOMATED DEPLOYMENT OF PROCESSES TO A DISTRIBUTED NETWORK ENVIRONMENT

(75) Inventor: Andriy Sukhyy, Lviv (UA)

(73) Assignee: Software AG, Darmstadt (DE)

( * ) Notice: Subject to any disclaimer, the term of this patent is extended or adjusted under 35 U.S.C. 154(b) by 300 days.

(21) Appl. No.: 13/323,339

(22) Filed: Dec. 12, 2011

(65) Prior Publication Data

US 2013/0138713 A1 May 30, 2013

(30) Foreign Application Priority Data

Nov. 28, 2011 (EP) .................................... 11190879

(51) Int. Cl.
*G06F 15/16* (2006.01)
*G06F 12/00* (2006.01)

(52) U.S. Cl.
USPC .......................................................... 709/218

(58) Field of Classification Search
CPC ..................... H04L 12/4641; H04L 29/12018; H04L 41/0853; H04L 47/10; H04L 49/201; H04L 49/3009; H04L 49/355; H04L 61/10; H04L 67/12; H04L 67/125; H04L 12/4645; H04L 1/24; H04L 41/0213; H04L 41/0668
USPC .................. 709/203, 217–218, 223–229, 250
See application file for complete search history.

(56) References Cited

U.S. PATENT DOCUMENTS 6,571,253 B1 * 5/2003 Thompson et al. .................. 1/1
7,461,335 B2 12/2008 Yarde et al.
7,562,041 B2 7/2009 Chedade et al.
7,707,158 B2 4/2010 Bogner et al.
2004/0237066 A1 11/2004 Grundy et al.
2006/0116922 A1 6/2006 Homann et al.
2006/0241956 A1 10/2006 Levy et al.
2007/0005618 A1 1/2007 Ivanov et al.
2008/0134018 A1 * 6/2008 Kembel et al. ................ 715/234
2009/0132906 A1 * 5/2009 Aoki ............................ 715/234
2009/0144729 A1 6/2009 Guizar
2009/0265684 A1 10/2009 Fuchs et al.
2010/0057482 A1 3/2010 Radhakrishnan et al.
2010/0094810 A1 * 4/2010 Ishibashi ...................... 707/662

(Continued)

FOREIGN PATENT DOCUMENTS

EP 1 662 431 A1 5/2006
EP 1 818 813 8/2007

OTHER PUBLICATIONS

Business Process Model and Notation (BPMN), http://www.omg.org/spec/BPMN/2.0/PDF (retrieved Dec. 9, 2011).

(Continued)

*Primary Examiner* — Zarni Maung
(74) *Attorney, Agent, or Firm* — Nixon & Vanderhye PC

(57) ABSTRACT

Certain example embodiments relate to a method for deploying a process to a distributed network environment, the process including a plurality of processing steps to be performed by a plurality of computing components of the distributed network environment, the method including:

Figure 1:
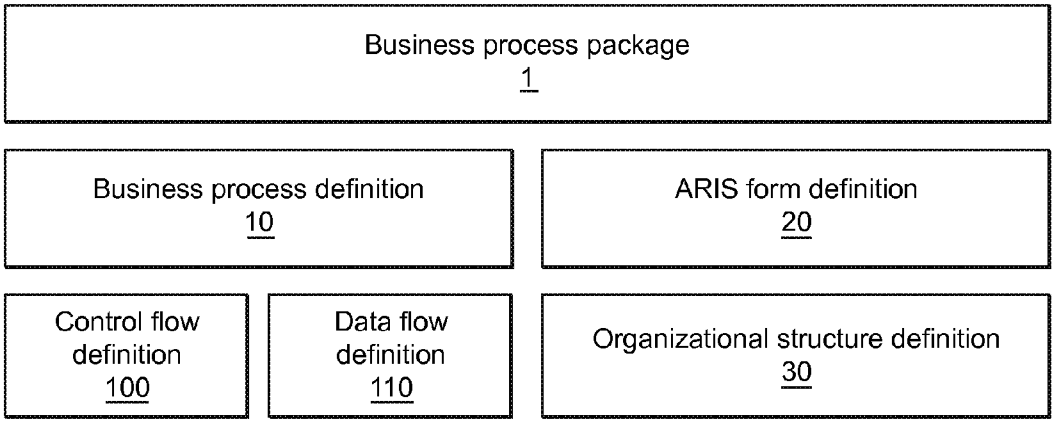

a. generating an Extensible Markup Language (XML) process package that defines information needed to execute the process; and
b. deploying the XML process package to the plurality of computing components;
c. wherein the XML process package includes:
   a control flow definition, including a definition of the plurality of processing steps and at least one connection between the plurality of processing steps; and
   a data flow definition, including a definition of at least one dataflow between the plurality of processing components.

18 Claims, 7 Drawing Sheets

(56) References Cited

U.S. PATENT DOCUMENTS

| | | | | |
|---|---|---|---|---|
| 2010/0185478 | A1 | 7/2010 | An et al. | |
| 2011/0004564 | A1 | 1/2011 | Rolia et al. | |
| 2012/0117479 | A1* | 5/2012 | Kembel et al. | 715/736 |
| 2013/0027734 | A1* | 1/2013 | Conley et al. | 358/1.13 |

OTHER PUBLICATIONS

Oasis, Web Services Business Process Execution Language Version 2.0, http://docs.oasis-open.org/wsbpel/2.0/wsbpel-v2.0.pdf (retrieved Dec. 9, 2011).

Business Process Definition MetaModel (BPDM), Process Definitions, http://www.omg.org/cgi-bin/doc?dtc/08-05-10.pdf (retrieved Dec. 9, 2011).

Semantics of Business Vocabulary and Business Rules (SBVR), http://www.omg.org/spec/SBVR/1.0/PDF (retrieved Dec. 9, 2011).

Introduction to OMG's Unified Modeling Language (UML), http://www.omg.org/gettingstarted/what_is_uml.htm (retrieved Dec. 9, 2011).

XPDL Support and Resources, http://www.wfmc.org/xpdl.html (retrieved Dec. 9, 2011).

ebXML enables enterprises of any size, in any global region, to conduct business using the Internet, http://www.ebxml.org/geninfo.htm (retrieved Dec. 9, 2011).

Yawl: Yet Another Work, http://www.yawlfoundation.org/ (retrieved Dec. 9, 2011).

Web Services Choreography Description Language Version 1.0, http://www.w3.org/TR/ws-cdl-10/ (retrieved Dec. 9, 2011).

BPEPeople, http://en.wikipedia.org/wiki/BPEL4People (retrieved Dec. 9, 2011).

jBPM Process Definition Language, Chapter 18, http://docs.jboss.org/jbpm/v3/userguide/jpdl.html (retrieved Dec. 9, 2011).

XForms 1.1, W3C Recommendation Oct. 20, 2009, http://www.w3.org/TR/xforms11/ (retrieved Dec. 9, 2011).

Oracle Business Process Management Suite, http://www.oracle.com/us/technologies/bpm/bpm-suite-078529.html (retrieved Dec. 9, 2011).

Managing Lombardi Process Servers, ftp://public.dhe.ibm.com/software/integration/lombardi-edition/WebSphere_Lombardi_Edition-7.2.0-Administration_Guide.pdf (retrieved Dec. 9, 2011).

Process made simple, IBM Blueworks Live, https://www.blueworkslive.com/home#!gettingStarted:overview (retrieved Dec. 9, 2011).

Bonita Open Solution, Open Source BPM, http://www.bonitasoft.com/products/bonita-open-solution-open-source-bpm (retrieved Dec. 9, 2011).

JBoss Community, jBPM, http://www.jboss.org/jbpm (retrieved Dec. 9, 2011).

ARIS-market-Leading Technology for Business Process Management, http://www.ids-scheer.com/set/590/ARIS_Platform_-_Product_brochure.pdf (retrieved Dec. 9, 2011).

* cited by examiner

METHOD AND SYSTEM FOR AUTOMATED DEPLOYMENT OF PROCESSES TO A DISTRIBUTED NETWORK ENVIRONMENT

This application claims priority to EP 11 190 879.4 filed 28 Nov. 2011, the entire contents of each of which are hereby incorporated by reference.

1. TECHNICAL FIELD

The present invention relates to a method and a system for automated deployment of processes to a distributed network environment.

2. THE PRIOR ART

Complex software applications are typically executed on a plurality of distributed processing components (such as clients and servers) connected over a network. Such distributed software applications are nowadays widely used for supporting the execution of complex processes, such as the manufacturing of a complex technical product (e.g. an automobile), the controlling of an assembly line, or the execution of business processes. In these scenarios, each computing component is in charge of executing a certain processing step of the process and thus, the interworking of the computing components must be coordinated correctly in order to achieve the overall process results.

To this end, a variety of description formats have been proposed in the prior art for defining processes, e.g. BPMN (Business Process Modeling Notation), BPEL (Business Process Execution Language), BPDM (Business Process Definition Metamodel), SVBR (Semantics of Business Vocabulary and Rules), UML (Unified Modeling Language), XPDL (XML Process Definition Language), ebXML BPSS (ebBP), YAWL (Yet Another Workflow Language), WS-CDL (Web Services Choreography Description Language), BPEL4People, jBPM Process Definition Language (JPDL) or XForm (form description format). A number of commercial products are currently available for exporting/importing business processes in the above-mentioned formats, e.g. Oracle BPM Suite, IBM WebSphere Lombardi Edition, IBM Blueworks Live, Bonita Open Solution, JBoss jBPM or the ARIS Platform of applicant.

Furthermore, various approaches have been proposed for converting process definition between the above-explained formats, e.g. in U.S. Pat. No. 7,562,041, U.S. Pat. No. 7,707,158, US 2010/0185478, US 2009/0265684, US 2006/241956, EP 1 662 431, US 2006/116922, US 2010/0057482, U.S. Pat. No. 7,461,335, US 2007/0005618, US 2011/0004564 and US 2009/0144729.

However, there is need not only to design processes in a convenient notation and to translate between different notations, but also to automate and run these processes in the actual distributed computing environment. In this context, a disadvantage is that the known description formats typically focus on the definition of the process structure, i.e. on defining the individual process steps and their interconnections. However, in order to actually execute such a process, additional information is needed, which cannot be easily defined with the known approaches.

A further drawback of the known process definition formats is that these formats (e.g. the above-mentioned BPMN, BPEL, JPDL, SVBR, ebXML and WS-CDL) are typically limited to fully automated business processes (i.e. the process steps are performed in an entirely computerized manner, e.g. by web services). However, typical real-life processes oftentimes comprise a mixture of automated processing steps and processing steps that involve human interactions. Therefore, most of the known description formats are not well suited for human-centric processes.

Therefore, the known process description formats, being tailored towards the definition of the structural aspects of a process, are not well suited for providing the complete information necessary to actually deploy (i.e. install) the process in a manner such that the process is executable by the underlying processing components.

It is therefore the technical problem underlying the present invention to provide an approach for deploying a process to a distributed network environment that provides all information needed to generate an executable definition of the process and thereby at least partly overcomes the above explained disadvantages of the prior art.

3. SUMMARY OF THE INVENTION

This problem is according to one aspect of the invention solved by a method for deploying a process to a distributed network environment, wherein the process comprises a plurality of processing steps to be performed by a plurality of computing components of the distributed network environment. In the embodiment of claim 1, the method comprises the steps of:

a. generating an Extensible Markup Language (XML) process package that defines information needed to execute the process; and
b. deploying the XML process package to the plurality of computing components;
c. wherein the XML process package comprises:
    - a control flow definition, comprising a definition of the plurality of processing steps and at least one connection between the plurality of processing steps; and
    - a data flow definition, comprising a definition of at least one dataflow between the plurality of processing components.

Accordingly, the embodiment defines an XML-based description format usable for defining a process definition which comprises all information needed to execute the process during runtime. In particular, the generated XML process package not only defines the control flow of the process (i.e. a definition of the individual processing steps and their connections), but also includes a (preferably complete) definition of the dataflows of all activities involves in the process. The dataflow definition preferably comprises a definition of the data exchanged between the individual processing steps, such as input and output data items and/or their types (which will be explained in more detail further below). As a result, the XML process package provided by the present invention comprises all information needed for the computing components to be able to interchange the information needed to execute the process. It should be noted that complete data flows are not part of the known process description formats, such as the above-mentioned BPEL4People or BPMN, but that such data flows play an essential role during the execution of a process.

In one aspect of the invention, the control flow definition comprises a plurality of activity types for the plurality of processing steps selected from the group comprising: abstract activity, human task activity, web service activity, scripting activity, email activity, embedded sub-process and/or independent sub-process. In this context, an abstract activity is to be understood as an activity (i.e. processing step) used for variable assignments. Typically, it does not have any specific semantic and does not perform any specific operation, but is rather used as a location where values can be assigned to process/instance/global variables. A scripting activity is an activity which executes e.g. JavaScript code. In one embodiment, it works on the object model of the Java ABNF Parser Generator (APG) and is intended as a customizable extension (similar to a plug-in) for specific actions and/or computations. An embedded subprocess may be understood as an activity which has an assignment of a subprocess. The subprocess is considered part of the main process and preferably has access to the data of the parent process. Lastly, an independent subprocess is to be understood as an activity which also has an assignment of a subprocess, however, it preferably constitutes a main process itself and has its own data and variable scope.

Furthermore, the control flow definition may comprise a definition of at least one event selected from the group comprising: start event (e.g. reflecting that a process instance has been triggered), end event (e.g. reflecting that a process instance ends with this step), cancel event (such an event may be attached to an activity (e.g. human task activity; see above) and may be activated when the activity has been cancelled), rule event, message event, intermediate event, terminate event (terminates the process instance), error event (may be activated when an activity runs into an error), timer event (may act as activity and wait a certain time (in which the process execution is paused and waiting), which may be defined in the data flow of the timer event) and/or link event (for connecting two processes with each other).

Additionally or alternatively, the control flow definition may comprise a definition of at least one gateway selected from the group comprising: parallel gateway (e.g. an opening AND gateway), synchronizer gateway (e.g. a closing AND gateway) and/or conditional gateway (e.g. OR or XOR gateway, wherein the condition(s) is/are defined in the data flow of the gateway).

In a further aspect of the present invention, the plurality of processing steps comprises a human task activity and the control flow definition comprises a definition of a workflow form, the workflow form comprising at least one input element for inputting data into the workflow form to execute the human task activity. Accordingly, the XML process package defined in accordance with the present invention is not limited to fully automated processes, but supports processes involving human interaction. Such human interaction is achieved by providing workflow forms in certain processing steps, where a user can input the information needed to perform the step.

Besides the above-mentioned human task activities, the plurality of processing steps may also comprise a web service activity and the control flow definition may comprise a web service address of the web service in charge of executing the web service activity.

Preferably, the definition of at least one dataflow between the plurality of processing components defined in the data flow definition comprises at least one dataflow operator, at least one source processing step of the dataflow, at least one target processing step of the dataflow, at least one constant and/or at least one variable.

Where the plurality of processing steps comprises a human task activity, the data flow definition preferably comprises at least one definition selected from the group comprising: executor or group of executors of the human task activity, a reference to a workflow form, human workflow patterns (such as a task-specific escalation and/or a predefined user for this task), human task completion policies (e.g. all required, only one required, all from pre-selection, voting), human task scenarios (e.g. resource patterns like segregation of duties (four eyes principle) and/or commit resource (chained execution)), task throughput time (e.g. the maximum throughput time indicating how long it should take to complete the task and triggering automated mechanisms such as reminders and/or escalation) and/or task priority (e.g. high, normal, low).

Where the plurality of processing steps comprises a web service activity, the data flow definition preferably comprises at least one definition selected from the group comprising: database name, database language, user login and/or password. Furthermore, where the plurality of processing steps comprises an email activity, the data flow definition preferably comprises at least one definition selected from the group comprising: at least one recipient of the email, email subject and/or email body.

In a preferred embodiment, the XML process package further comprises a definition of an organizational structure for executing the plurality of processing steps, wherein the organizational structure comprises at least one organizational unit, at least one role, at least one person, at least one relationship between the organizational units and/or at least one escalation manager.

In yet another aspect of the present invention, the method comprises the further steps of exporting the XML process package from a first computing component of the plurality of computing components of the distributed network environment; transmitting the XML process package to a second computing component of the plurality of computing components of the distributed network environment; and deploying the XML process package at the second computing component of the plurality of computing components of the distributed network environment. Accordingly, the XML process package of the present invention may be used to exchange deployable process versions from one server to another server (e.g. running ARIS Process Governance).

The present invention is also directed to a computer program comprising instructions for implementing any of the above-described methods.

Lastly, a system is provided for deploying a process to a distributed network environment, wherein the process comprises a plurality of processing steps to be performed by a plurality of computing components of the distributed network environment, and wherein the system comprises:

a. a generator, adapted for generating an Extensible Markup Language (XML) process package (1) that defines information needed to execute the process; and
b. a deployment means, adapted for deploying the XML process package (1) to the plurality of computing components;
c. wherein the XML process package (1) comprises:
   - a control flow definition (100), comprising a definition of the plurality of processing steps and at least one connection between the plurality of processing steps; and
   - a data flow definition (110), comprising a definition of at least one dataflow between the plurality of processing components.

The above-described system may further comprise means adapted for performing any of the methods explained further above.

4. SHORT DESCRIPTION OF THE DRAWINGS

Figure 2:
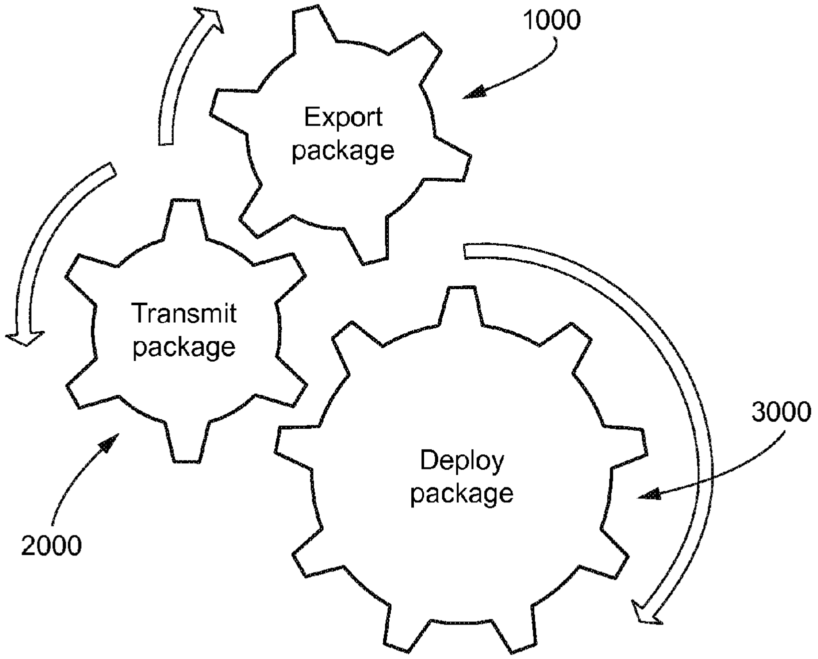
Figure 3:
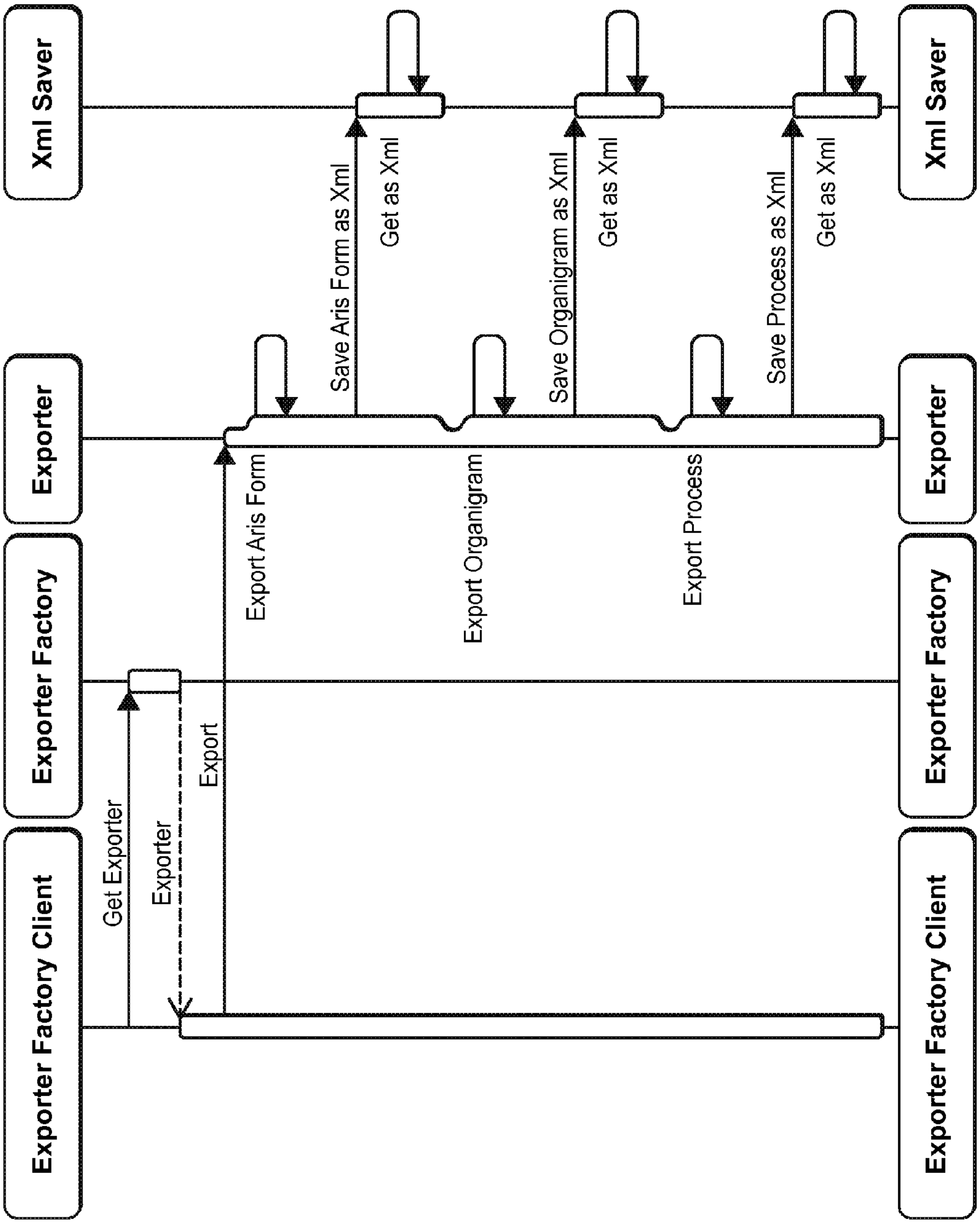
Figure 4:
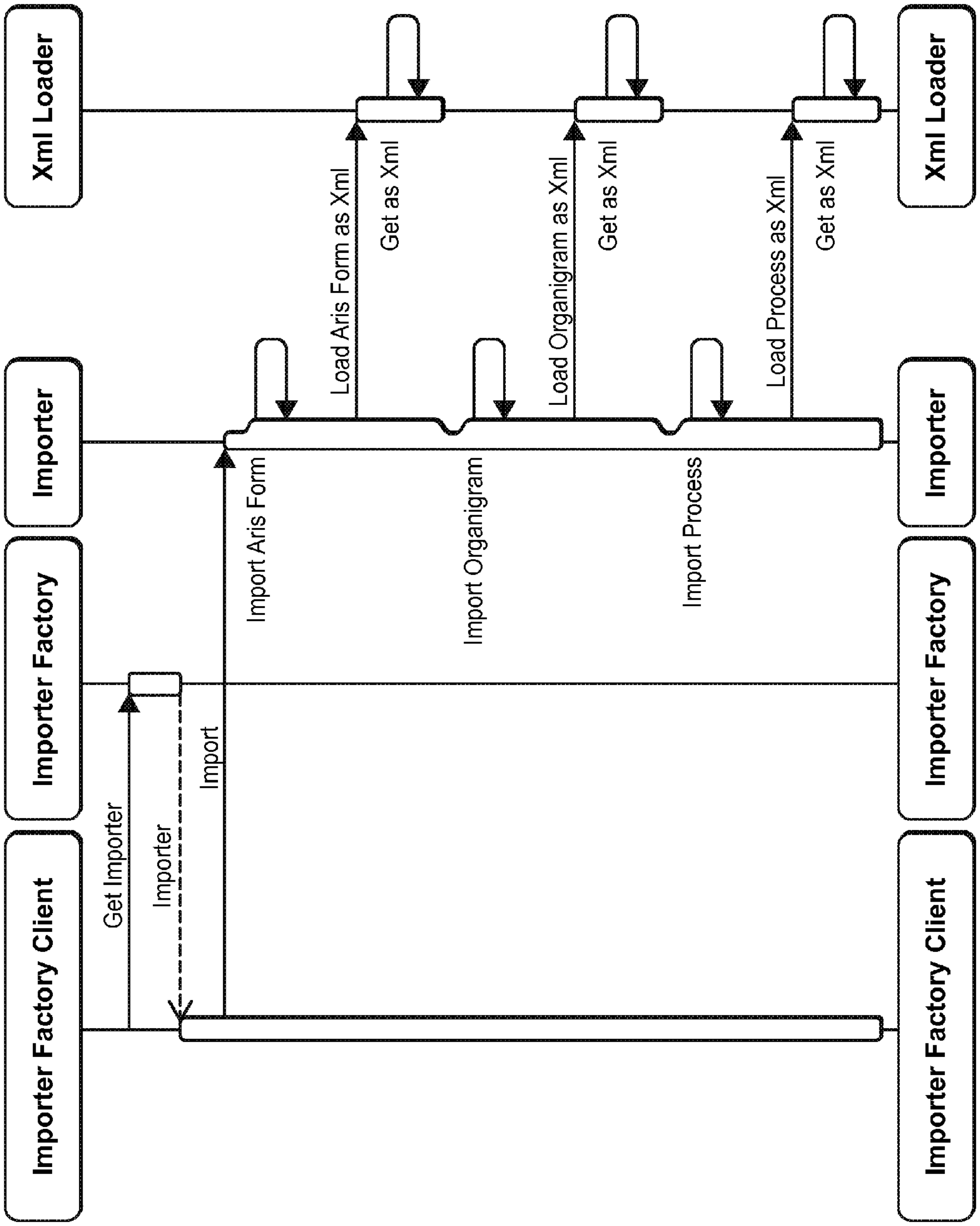
Figure 5:
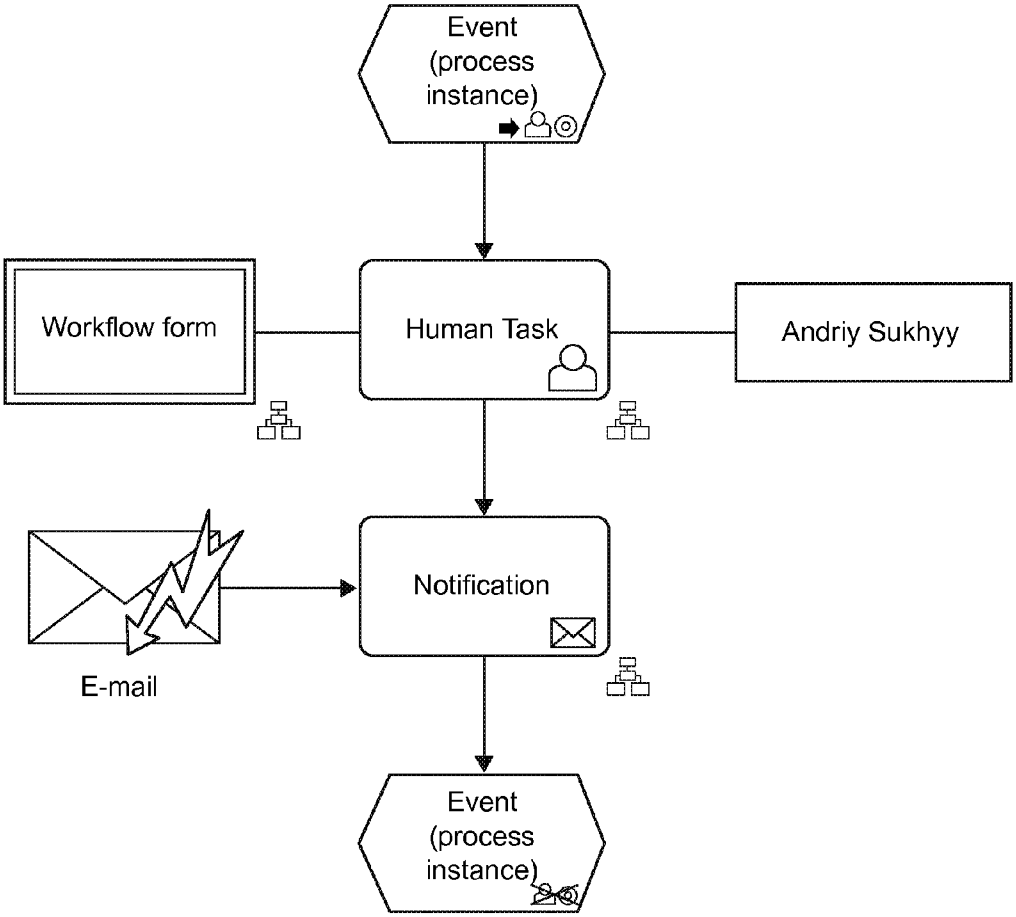
Figure 6:
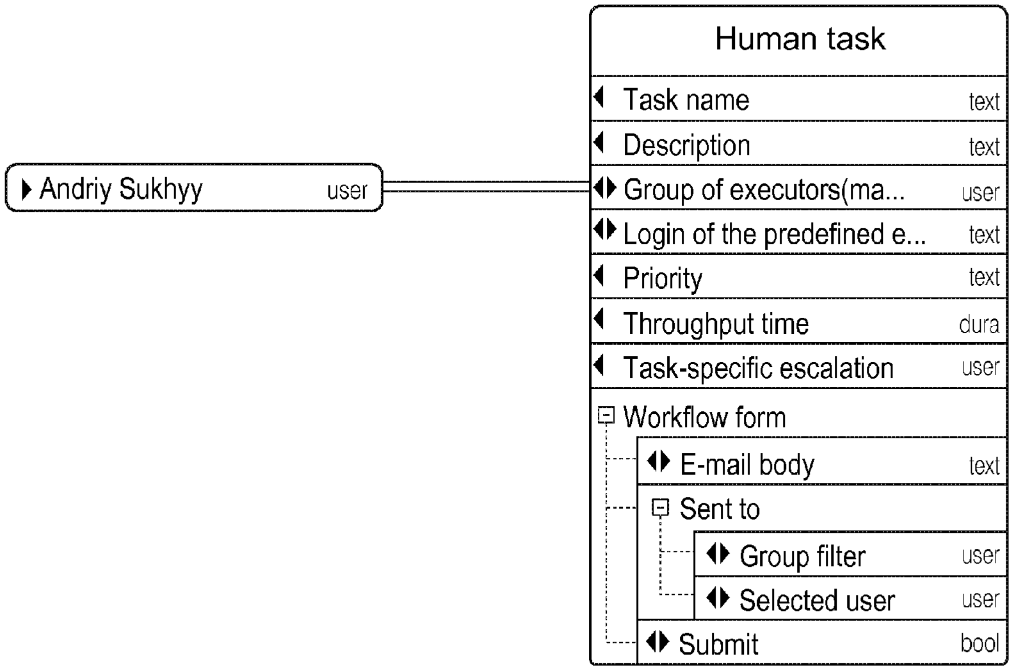
Figure 7:
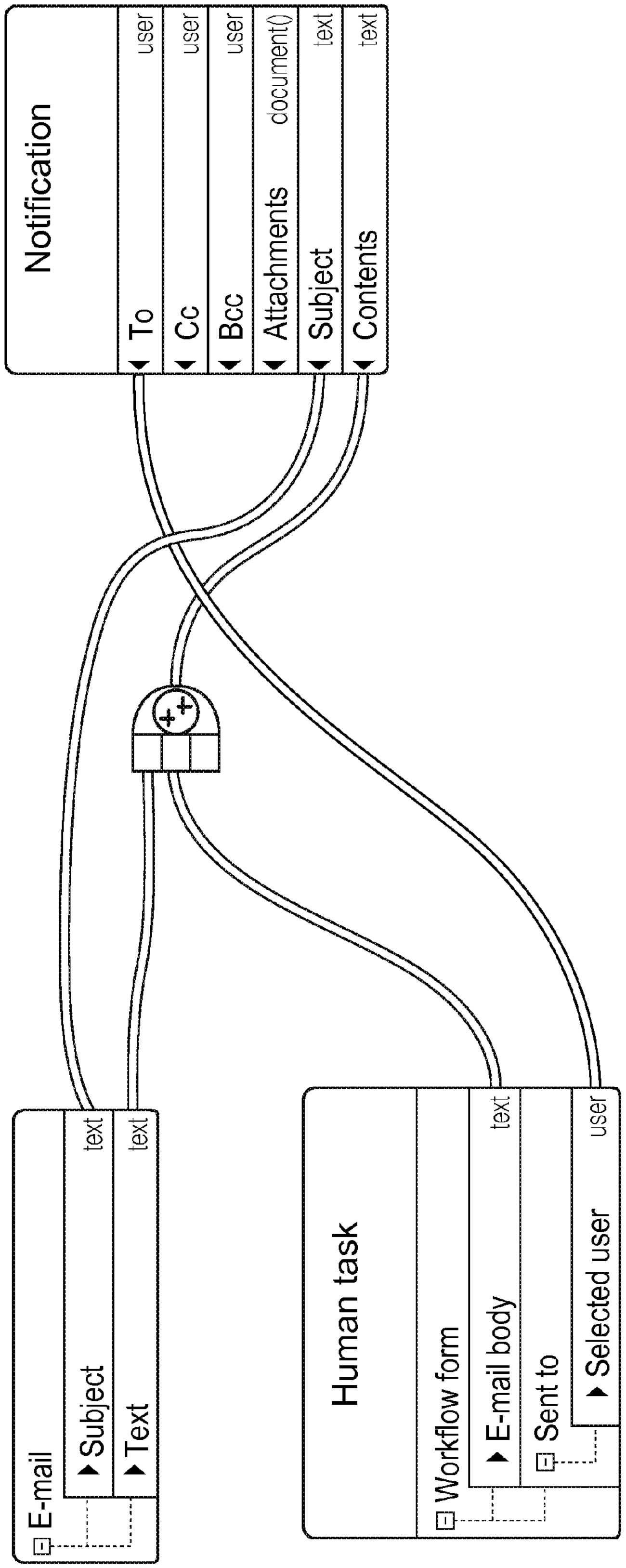

In the following detailed description, presently preferred embodiments of the invention are further described with reference to the following figures:

FIG. 1: A schematic view of the components of an XML process package in accordance with an embodiment of the present invention;

FIG. 2: An overview of a method for deploying an XML process package in accordance with an embodiment of the present invention;

FIG. 3: A sequence diagram showing an embodiment of the exporting step of the method of FIG. 2;

FIG. 4: A sequence diagram showing an embodiment of the importing step of the method of FIG. 2;

FIG. 5: An exemplary control flow definition of a process defined in accordance with an embodiment of the present invention;

FIGS. 6-7: Exemplary data flow definitions of a process defined in accordance with an embodiment of the present invention; and FIG. 8: An exemplary transformation from EPC to BPMN notation in accordance with an embodiment of the present invention.

5. DETAILED DESCRIPTION

In the following, a presently preferred embodiment of the invention is described with respect to a definition format for processes as schematically shown in FIG. 1. In a preferred embodiment, the present invention provides a description format for the exchange of business processes including data model, organizational structure, forms and services. However, the present invention is not limited to business processes, but may be similarly employed for defining other types of processes, such as complex manufacturing processes or processes for controlling technical machinery, such as assembly lines or the like.

Generally, the business processes of an organization are typically based on multiple information aspects, such as:

- Process (control) flow
- Organizational structure
- Workflow forms for human interaction
- IT services supporting the process steps
- Data flow between the different process steps Furthermore, there is a need not only to design business processes in a business-friendly notation (as done e.g. by the prior art approaches EPC or BPMN), but also to automate and run these processes. In particular, regarding the concept of Model2Execute of applicant (which concerns a tight integration with CentraSite and webMethods BPMS of applicant to take business processes from a strategy and design point of view and transform them into models for process automation; cf. also http://www.ariscommunity.com/users/nina-uhl/2010-09-16-finally-model-2-execute-idea-reality), a preferred application of the present invention is based on a complex governance process which is automatically supporting and governing the complete workflow between the multiple processing components preferably executing applicant's products, such as ARIS, webMethods Designer and CentraSite. In this context, there is a need to pre-deploy the processes silently for the user so that these can be directly instantiated without having the process design itself.

To this end, the present invention proposes a generic format which contains all necessary information for the process execution. The proposed format may be also used to exchange deployable process versions from one server to another server (as e.g. ARIS Process Governance). Concretely, this may be achieved by the application setup based on a packaged XML representation of the executable governance processes in the proposed format. As can be seen in FIG. 1, the present invention proposes in one embodiment a specification in generic format (preferably XML-based) for executable governance processes, which supports all data needed for the execution of human-centric governance workflows, i.e. control flow 110 (cf. FIG. 1), organizational structures 30, workflow forms 20, IT services and data flow models 110.

The present invention thereby differs from the known process description formats, in that most of the known formats are targeting fully automated business processes (i.e. process steps are typically web services) without human interactions (e.g. BPMN, BPEL, JPDL, SVBR, ebXML, WS-CDL). Therefore, the present invention provides e.g. for user/role modeling (organization structure) and also user interactions, such as workflow forms in a human readable format or human workflow patterns, such as escalation, delegation, human task completion policies or human task scenarios (resource patterns) like segregation of duties (four eyes principle) and commit resource (chained execution) (e.g. XPDL supports human interaction however not human workflow patterns). In the prior art, on the contrary, e.g. BPEL4People does not include the complete workflow definition and does not support subprocesses. Further, some known formats (BPMN 1.0, YAWL) are simply modeling formats without a defined serialization format, as provided by the present invention. In addition, some of the known formats do not support subprocesses (BPEL, BPEL4People) and data modeling (clear definition of data flow) (BPMN). Moreover, JPDL is used inside the JBoss jBPM product and is more developer-centric rather than targeted to non-technical users.

In a particularly preferred embodiment, an XML-based process package 1 (cf. FIG. 1) defined in accordance with the proposed description format is based on defined XML schemas for each component described in the following.

Control Flow 100

The control flow definition 100 preferably comprises definitions of the following elements:

- Activities: abstract activity, human task activity, web service activity, scripting activity, email activity, embedded sub process, independent sub process.
- Events: start event, end event, cancel event, rule event, message event, intermediate event, terminate event, error event, timer event, link event.
- Gateways: parallel gateway, synchronizer gateway, conditional gateway (e.g. XOR, OR).
- Connections (used to connect activities, events, gateways elements): abstract connection, conditional connection.
- Process In the following, various examples of the above-described components are explained:

Control Flow of Human Task Activity

The control flow of a human task activity preferably includes:

- workflow form id (aformId element), which will be used in human task interaction during process instance execution
- incoming and outgoing elements preferably contain a collection of outgoing and incoming connections, respectively. They are preferably common for activities, events and gateways.

An XML-based example is:

```
<activity xmlns:xsi=http://www.w3.org/2001/XMLSchema-
    instance xsi:type="humanTask">
<id>70zd##9e####x##</id>
<guid>b978e6c3-fc04-11dd-620e-0014220e1757</guid>
<occid>b978e6c4-fc04-11dd-620e-0014220e1757</occid>
<name>Human task</name>
<activityType>ACTIVITY__HUMAN__TASK</activityType>
<outgoing>
<connection>...</connection>
</outgoing>
<incoming>
<connection>...</connection>
```

-continued

```
</incoming>
<attributes />
<diagramRef>...</diagramRef>
<dataFlowModel>...</dataFlowModel>
<aformId>DjDUQL7FT8y8HH183aYXSQ==</aformId>
</activity>
```

Control Flow of Conditional Gateway

The control flow of a conditional gateway preferably includes:

Conditions mapping, which are defined in outgoing connections (outgoing element)

An XML-based example is:

```
<activity xmlns:xsi=http://www.w3.org/2001/XMLSchema-
        instance xsi:type="or">
<id>ku####aj####x##</id>
<guid>1249dd58-7183-11e0-353c-fecf374d36ce</guid>
<occid>ebcd0dc0-dfe8-347e-bf9a-aa192318fd26</occid>
<name>OR rule</name>
<activityType>GATEWAY__FORK__OR</activityType>
<outgoing>
<connection>...</connection> </outgoing>
<incoming><connection>...</connection> </incoming>
<attributes />
<diagramRef>...</diagramRef>
<dataFlowModel>...</dataFlowModel>
<conditions />
</activity>
<activity xmlns:xsi=http://www.w3.org/2001/XMLSchema-
        instance xsi:type="or">
<id>t1####aj####x##</id>
<guid>12641c03-7183-11e0-353c-fecf374d36ce</guid>
<occid>c80d5740-1863-11de-2d54-edd10b6e5a39</occid>
<name>OR rule</name>
<activityType>GATEWAY__JOIN__OR</activityType>
<outgoing><connection>...</connection></outgoing>
<incoming><connection>...</connection></incoming>
<attributes />
<diagramRef>...</diagramRef>
<conditions />
</activity>
```

Control Flow of Web Service Activity

The control flow of a web service (e.g. SOAP) activity preferably includes:

web service url (location element)

web service name (serviceName element)

wsdl content (wsdlContent element)

operation name (operation element)

port name (port element)

An XML-based example is:

```
<activity xmlns:xsi=http://www.w3.org/2001/XMLSchema-
        instance xsi:type="wscall">
<id>1#####9b####x##</id>
<guid>ea6e567b-edeb-11dd-4e5b-e9dfbaaccd0f</guid>
<occid>ea6e567c-edeb-11dd-4e5b-e9dfbaaccd0f</occid>
<name>Automated task</name>
<activityType>ACTIVITY__WEB__SERVICE</activityType>
<outgoing><connection>...</connection></outgoing>
<incoming><connection>...</connection></incoming>
<attributes />
<diagramRef>...</diagramRef>
<dataFlowModel>...</dataFlowModel>
<location>http://localhost:7071/aris/services/
        arisScript</location>
<licenseKey>...</licenseKey>
<serviceName
        xmlns:ns5="http://www.idsscheer.com/aris/
        services/">ns5:ArisScriptService</serviceName>
```

-continued

```
<wsdlContent>...</wsdlContent>
<wsdlTargetNamespace>http://www.idsscheer.com/aris/services
/</wsdlTargetNamespace>
<operation
        xmlns:ns5="http://www.idsscheer.com/aris/
        services/">ns5:lock</operation>
<port>ArisScriptPort</port>
<wsdlGuid>7bad0100-ab28-11dd-5458-a5c213f0f67c</wsdlGuid>
</activity>
```

Control Flow of Scripting Activity

The control flow of a scripting activity preferably includes:

script body (script element)

An XML-based example is:

```
<activity xmlns:xsi=http://www.w3.org/2001/XMLSchema-
        instance xsi:type="scripting">
<id>qpp###5x####x##</id>
<guid>e836383e-f1f2-11dd-3c01-e469304245b0</guid>
<occid>e836383f-f1f2-11dd-3c01-e469304245b0</occid>
<name>Automated task</name>
<activityType>ACTIVITY__SCRIPTING</activityType>
<outgoing><connection>...</connection></outgoing>
<incoming><connection>...</connection></incoming>
<attributes />
<diagramRef>...</diagramRef>
<dataFlowModel>...</dataFlowModel>
<script>...</script>
</activity>
```

Control Flow of Timer Event

The control flow of a timer event preferably includes:

repetition count (repetition element)

flag, which indicates possibility to cancel activity (mayCancelActivity element)

ids of triggered activities (activityIds element)

An XML-based example is:

```
<activity xmlns:xsi=http://www.w3.org/2001/XMLSchema-
   instance xsi:type="timerEvent">
   <id>w7####aj####x##</id>
   <guid>43dc64f0-d04d-11de-386c-000c29dd00fe</guid>
   <occid>43dc64f1-d04d-11de-386c-000c29dd00fe</occid>
   <name>Timer event</name>
   <activityType>INTERMEDIATE__TIMER</activityType>
   <outgoing><connection> . . . </connection></outgoing>
   <incoming><connection> . . . </connection></incoming>
   <attributes />
   <diagramRef> . . . </diagramRef>
   <dataFlowModel> . . . </dataFlowModel>
   <triggeredObjects><activityIds /></triggeredObjects>
   <repetition />
   <mayCancelActivity>false</mayCancelActivity>
</activity>
```

Data Flow 110

The data flow definition 110 preferably comprises definitions of the following elements:

Data flow: data flow operators (equal, greater than, etc) and their operands, which are preferably represented by data flow links, activities used in the data flow (as source or as target), constants, variables.

Constants: A constant has type, name and/or value.

Variables: A variable has type, scope and/or initial value.

In the following, various examples of the above-described components are explained:

Data Flow of Human Tasks

The data flow of a human task preferably includes:

executor/group of executors of the human task

- reference to the dialog (workflow form) connected to this human task in human readable format
- human workflow patterns like task-specific escalation and predefined user for this task
- human task completion policies (all required, only one required, all from pre-selection, voting)
- human task scenarios (resource patterns) like segregation of duties (four eyes principle) and commit resource (chained execution)
- task throughput time (maximum throughput time which indicates how long should it take to complete this task and which triggers automated mechanisms like reminder and escalation)
- task priority (high, normal, low)

An XML-based example is:

```
<mapping>
<activityId>1321f601-f357-11dd-4916-
  9a61c9dc4285</activityId>
<consumerId>1321f601-f357-11dd-4916-
  9a61c9dc4285</consumerId>
<links>
<link xmlns:xsi=http://www.w3.org/2001/XMLSchema-instance
  xsi:type="operational-link">
<op>ASSIGNMENT</op>
<operands><operand xsi:type="constant-
  link"><value> . . . </value></operand>
<operand xsi:type="activity-link">
<source>1321f601-f357-11dd-4916-9a61c9dc4285</source>
<path>/participantGroups/</path>
</operand>
</operands>
</link>
<link xmlns:xsi=http://www.w3.org/2001/XMLSchema-instance
  xsi:type="operational-link">
<op>ASSIGNMENT</op>
<operands>
<operand xsi:type="constant-
  link"><value> . . . </value></operand>
<operand xsi:type="activity-link"><source>1321f601-f357-
  11dd-4916-9a61c9dc4285</source>
<path>/predefinedUser/</path>
</operand>
</operands>
</link>
<link xmlns:xsi=http://www.w3.org/2001/XMLSchema-instance
  xsi:type="operational-link">
<op>ASSIGNMENT</op>
<operands><operand xsi:type="constant-
  link"><value>HIGH</value></operand>
<operand xsi:type="activity-link"><source>1321f601-f357-
  11dd-4916-9a61c9dc4285</source>
<path>/priority/</path>
</operand>
</operands>
</link>
<link xmlns:xsi=http://www.w3.org/2001/XMLSchema-instance
  xsi:type="operational-link">
<op>ASSIGNMENT</op>
<operands><operand xsi:type="constant-
  link"><value>PT0M</value></operand>
<operand xsi:type="activity-link"><source>1321f601-f357-
  11dd-4916-9a61c9dc4285</source>
<path>/duration/</path>
</operand>
</operands>
</link>
<link xmlns:xsi=http://www.w3.org/2001/XMLSchema-instance
  xsi:type="operational-link">
<op>ASSIGNMENT</op>
```

-continued

```
<operands><operand xsi:type="constant-
  link"><value> . . . </value></operand>
<operand xsi:type="activity-link"><source>1321f601-f357-
  11dd-4916-
  9a61c9dc4285</source><path>/escalatedTo/</path></operand>
  </operands>
</link></links></mapping>
```

Data Flow of E-Mail Activity

The data flow of an email activity preferably includes:

- Recipients of the notification (to, cc, bcc represented by value in path element of activity link)
- E-mail subject (same approach is used as for recipients)
- E-mail body (same approach is used as for recipients)

An XML-based example is:

```
<mapping>
<activityId>ec9f7dc7-31f4-31aa-b226-
  66b6bf99f3b0</activityId>
<consumerId>ec9f7dc7-31f4-31aa-b226-
  66b6bf99f3b0</consumerId>
<links>
<link xmlns:xsi=http://www.w3.org/2001/XMLSchema-instance
  xsi:type="operational-link">
<op>ASSIGNMENT</op>
<operands>
<operand xsi:type="activity-link"><source>4594d0f2-e74c-
  349f-a259-bd23163215f4</source>
<path>/escalateUserId/</path></operand>
<operand xsi:type="activity-link"><source>ec9f7dc7-31f4-
  31aa-b226-66b6bf99f3b0</source>
<path>/to/</path></operand>
</operands>
</link>
<link xmlns:xsi=http://www.w3.org/2001/XMLSchema-instance
  xsi:type="operational-link">
<op>ASSIGNMENT</op>
<operands>
<operand xsi:type="constant-link"><value>Escalation:Human
  task</value></operand>
<operand xsi:type="activity-link"><source>ec9f7dc7-31f4-
  31aa-b226-66b6bf99f3b0</source>
<path>/subject/</path></operand></operands>
</link><link xmlns:xsi=http://www.w3.org/2001/XMLSchema-
  instance xsi:type="operational-link">
<op>ASSIGNMENT</op>
<operands><operand xsi:type="operational-
  link"><op>CONCAT</op><operands>
<operand xsi:type="constant-link">
<value> . . . </value>
</operand>
<operand xsi:type="constant-link">
<value> . . . </value>
</operand>
<operand xsi:type="operational-
  link"><op>PARTICIPANT_NAME</op><operands>
<operand xsi:type="activity-link"><source>4594d0f2-e74c-
  349f-a259-bd23163215f4</source>
<path>/userId/</path></operand></operands></operand></operands>
  </operand>
<operand xsi:type="activity-link">
<source>ec9f7dc7-31f4-31aa-b226-66b6bf99f3b0</source>
<path>/body/</path>
</operand>
</operands>
</link>
<link xmlns:xsi="http://www.w3.org/2001/XMLSchema-instance"
xsi:type="operational-link">
<op>ASSIGNMENT</op><operands><operand xsi:type="constant-
  link">
<value>e23fd19759a46423b0a7f198965d5b6f</value></operand>
<operand xsi:type="activity-link">
```

-continued

```
<source>ec9f7dc7-31f4-31aa-b226-66b6bf99f3b0</source>
<path>/ads__password/</path>
</operand>
</operands>
</link>
</links>
</mapping>
```

Data Flow of Web Service Activity

The data flow of an ARIS web service preferably includes (corresponding parts are represented by data flow links):

Database name (for example database name is assigned from start event dataflow to dbName element of context)

Database language

User login

Password

An XML-based example is:

```
<mapping>
<activityId>ea6e567c-edeb-11dd-4e5b-
   e9dfbaaccd0f</activityId>
<consumerId>ea6e567c-edeb-11dd-4e5b-
   e9dfbaaccd0f</consumerId>
<links>
<link xmlns:xsi=http://www.w3.org/2001/XMLSchema-instance
   xsi:type=“operational-link”>
<op>ASSIGNMENT</op>
<operands>
<operand xsi:type=“activity-link”>
<source>8ca557c3-a4cd-11dd-38a4-c69f45a7a089</source>
<path>/context/currentDatabase/</path>
</operand>
<operand xsi:type=“activity-link”>
<source>ea6e567c-edeb-11dd-4e5b-e9dfbaaccd0f</source>
<path>/inputMessage/dbName/</path>
</operand>
</operands>
</link>
<link xmlns:xsi=“http://www.w3.org/2001/XMLSchema-instance”
xsi:type=“operational-link”>
<op>ASSIGNMENT</op>
<operands>
<operand xsi:type=“activity-link”>
<source>8ca557c3-a4cd-11dd-38a4-c69f45a7a089</source>
<path>/context/currentLanguage/</path>
</operand>
<operand xsi:type=“activity-link”>
<source>ea6e567c-edeb-11dd-4e5b-e9dfbaaccd0f</source>
<path>/inputMessage/dbLocale/</path>
</operand>
</operands>
</link>
<link xmlns:xsi=“http://www.w3.org/2001/XMLSchema-instance”
xsi:type=“operational-link”>
<op>ASSIGNMENT</op>
<operands>
<operand xsi:type=“constant-link”>
<value>e23fd19759a46423b0a7f198965d5b6f</value>
</operand>
<operand xsi:type=“activity-link”>
<source>ea6e567c-edeb-11dd-4e5b-e9dfbaaccd0f</source>
<path>/inputMessage/dbPassword/</path>
</operand>
</operands>
</link>
<link xmlns:xsi=“http://www.w3.org/2001/XMLSchema-instance”
xsi:type=“operational-link”>
<op>ASSIGNMENT</op>
<operands>
<operand xsi:type=“activity-link”>
<source>8ca557c3-a4cd-11dd-38a4-c69f45a7a089</source>
<path>/context/selectedGuids/guid/</path>
</operand>
<operand xsi:type=“activity-link”>
<source>ea6e567c-edeb-11dd-4e5b-e9dfbaaccd0f</source>
```

-continued

```
<path>/inputMessage/selectedItems/identifier/</path>
</operand>
</operands>
</link>
<link xmlns:xsi=“http://www.w3.org/2001/XMLSchema-instance”
xsi:type=“operational-link”>
<op>ASSIGNMENT</op>
<operands>
<operand xsi:type=“constant-link”>
<value>true</value>
</operand>
<operand xsi:type=“activity-link”>
<source>ea6e567c-edeb-11dd-4e5b-e9dfbaaccd0f</source>
<path>/inputMessage/includeObjects/</path>
</operand>
</operands>
</link>
<link xmlns:xsi=“http://www.w3.org/2001/XMLSchema-instance”
xsi:type=“operational-link”>
<op>ASSIGNMENT</op>
<operands>
<operand xsi:type=“constant-link”>
<value>http://localhost:7071/aris/services/arisScript</value>
</operand>
<operand xsi:type=“activity-link”>
<source>ea6e567c-edeb-11dd-4e5b-e9dfbaaccd0f</source>
<path>/endpoint/</path>
</operand>
</operands>
</link>
</links>
</mapping>
```

Data Flow of Scripting Activity

The data flow of a scripting activity preferably includes a mapping of an input massage which is expected by the script, which is defined in the control flow of the scripting activity, for example:

```
<mapping>
<activityId>e836383f-f1f2-11dd-3c01-
   e469304245b0</activityId>
<consumerId>e836383f-f1f2-11dd-3c01-
   e469304245b0</consumerId>
<links>
<link xmlns:xsi=http://www.w3.org/2001/XMLSchema-instance
   xsi:type=“operational-link”>
<op>ASSIGNMENT</op>
<operands>
<operand xsi:type=“operational-link”>
<op>COLLECTION__TO__COLLECTION</op>
<operands>
<operand xsi:type=“operational-link”>
<op>CREATE__COLLECTION</op>
<operands>
<operand xsi:type=“constant-
   link”><value>false</value></operand>
<operand xsi:type=“constant-
   link”><value>true</value></operand>
</operands>
</operand>
</operands>
</operand>
<operand xsi:type=“activity-link”><source>e836383f-f1f2-
   11dd-3c01-e469304245b0</source>
<path>/inputMessage/elements/</path>
</operand>
</operands>
</link>
</links></mapping>
```

Data Flow of Start Event

Can be used in other dataflows. Preferably, a user cannot use the dataflow of a start event as target.

Data Flow of Timer Event

The data flow of a timer event preferably includes a duration mapping in ISO format, for example:

```
<mapping>
<activityId>43dc64f1-d04d-11de-386c-
  000c29dd00fe</activityId>
<consumerId>43dc64f1-d04d-11de-386c-
  000c29dd00fe</consumerId>
<links>
<link xmlns:xsi="http://www.w3.org/2001/XMLSchema-instance"
  xsi:type="operational-link">
<op>ASSIGNMENT</op>
<operands>
<operand xsi:type="operational-
  link"><op>DURATION__END__DATE</op><operands>
<operand xsi:type="operational-
  link"><op>CURRENT__DATE</op><operands /></operand>
<operand xsi:type="constant-
  link"><value>PT2M</value></operand>
</operands>
</operand>
<operand xsi:type="activity-link">
<source>43dc64f1-d04d-11de-386c-000c29dd00fe</source>
<path>/timeDate/</path>
</operand>
</operands>
</link>
</links>
</mapping>
```

Data Flow of Conditional Gateway

An XML-based example is:

```
<mapping>
<activityId>ebcd0dc0-dfe8-347e-bf9a-
  aa192318fd26</activityId>
<consumerId>ebcd0dc0-dfe8-347e-bf9a-
  aa192318fd26</consumerId>
<links>
<link xmlns:xsi=http://www.w3.org/2001/XMLSchema-instance
  xsi:type="operational-link">
<op>ASSIGNMENT</op><operands><operand
  xsi:type="operational-link"><op>EQUALS</op><operands>
<operand xsi:type="activity-link">
<source>5c5bc133-14a5-11de-343a-9fb968779d51</source>
<path>/{http://www.ids-
  scheer.com/namespace/aform}aFormData/instance/Number__field/
  You__favourite__figure__is/</path>
</operand><operand xsi:type="constant-
  link"><value>5</value></operand></operands>
</operand><operand xsi:type="activity-
  link"><source>ebcd0dc0-dfe8-347e-bf9a-
  aa192318fd26</source>
<path>/__c5bc135__14a5__11de__343a__9fb968779d51/</path></operand>
</operands>
</link>
<link xmlns:xsi=http://www.w3.org/2001/XMLSchema-instance
  xsi:type="operational-link">
<op>ASSIGNMENT</op><operands><operand
  xsi:type="operational-link"><op>GREATER__THAN</op>
<operands>
<operand xsi:type="activity-link">
<source>5c5bc133-14a5-11de-343a-9fb968779d51</source>
<path>/{http://www.ids-
  scheer.com/namespace/aform}aFormData/instance/Number__field/
  You__favourite__figure__is/</path>
</operand><operand xsi:type="constant-
  link"><value>5</value></operand></operands>
</operand>
<operand xsi:type="activity-link">
<source>ebcd0dc0-dfe8-347e-bf9a-aa192318fd26</source>
<path>/__c5bc139__14a5__11de__343a__9fb968779d51/</path>
```

-continued

```
</operand>
</operands>
</link>
<link xmlns:xsi=http://www.w3.org/2001/XMLSchema-instance
  xsi:type="operational-link">
<op>ASSIGNMENT</op>
<operands>
<operand xsi:type="operational-link">
<op>SMALLER__OR__EQUALS</op>
<operands>
<operand xsi:type="activity-link">
<source>5c5bc133-14a5-11de-343a-9fb968779d51</source>
<path>/{http://www.ids-
  scheer.com/namespace/aform}aFormData/instance/Number__field/
  You__favourite__figure__is/</path>
</operand>
<operand xsi:type="constant-link">
<value>5</value>
</operand>
</operands>
</operand>
<operand xsi:type="activity-link">
<source>ebcd0dc0-dfe8-347e-bf9a-aa192318fd26</source>
<path>/__c5bc137__14a5__11de__343a__9fb968779d51/</path>
</operand>
</operands>
</link>
</links>
</mapping>
```

Organization Chart 30

The organizational structure schema 30 preferably comprises definitions of the following organizational elements (preferably including LDAP attributes):

- Organizational units
- Roles
- Persons
- Relationships between the organizational elements
- Escalation managers Dialogs for Human Interaction 20

The forms (dialogs) schema 20 preferably comprises definitions of forms (e.g. ARIS Form, which is used in human interaction and used by human task activities).

Preferred Implementation

In a preferred implementation of the above-described aspects of the invention, an XML process package 1 (cf. FIG. 1) adhering to the proposed description format provides all information necessary to deploy (i.e. install) and execute the defined process on a plurality of computing components of a networked environment. The necessary information includes all of the above-explained aspects of control flow 100, organizational structures 30, data flow models 110 and human-workflow forms 20. These components are preferably stored in XML files and packed in a package 1. Each component is well defined in an XML schema (cf. the examples above and the further examples below).

The package 1 is fully sufficient for further transmission and execution of a business process (e.g. on ARIS Process Governance). It may be used for transferring the Model2Execution governance processes (e.g. Share with IT) after process design as a pre-deployed and ready-to-be-instantiated governance process.

Preferred Deployment Method

FIG. 2 shows a preferred life cycle of a deployment package 1. As can be seen, in the export phase 1000, a user may export a certain package 1 (e.g. by using the export menu item from the UI to create the package, for example in ARIS Process Automation Architect (APAA)). In the transmit phase 2000 (interchange of package), the package 1 is transferred and can be used in different ARIS Process Governance (APG)

servers. Finally, the deploy phase 3000 represents the deployment of the package inside the APG server.

In the following, preferred implementations of the exporting step moo and the importing step 3000 will be described in more detail.

FIG. 3 shows an exemplary sequence diagram for the exporting step moo. In the first stage, the client obtains an Exporter class instance and calls a method to export the process structure into the XML-based business process package 1. In turn, the Exporter class instance executes an export for each component. The write operation is in the responsibility of an Xml Saver class instance, which will save the exported component as XML. In order to ensure the saving in XML format, for each component there is provided a mapping between Java and XML representation of the data structure. In this mapping, JAXB is preferably used as backend.

FIG. 4 shows an exemplary sequence diagram for the importing step 3000. In the first stage, the client obtains an Importer class instance and calls a method to import the business process package 1. The Importer class instance performs an operation reverse to that explained further above in connection with the Exporter class instance. In other words, the Importer class is essentially the mirror of the Exporter class.

PRACTICAL EXAMPLE

In the following, a practical example for employing the concepts of the present invention will be described with reference to FIGS. 5-7.

Generally, business processes, similar to any other structured and formalized processes, can be represented as a series of processing steps. In the world of business processes, a processing step is typically called activity, so that the terms "processing step" and "activity" should be interpreted as synonyms within the present invention. In order to form a series, i.e. an actual sequence, of processing steps, connections are needed. Therefore, activities and connections are generally suitable to describe the control flow 100 of a given business process. However, this is not enough to complete the modelling of the process. Rather, in order to make the modeling complete, applicant has found that it is necessary to introduce the following additional concepts into the process definition:

- data flow, which represents the data involved in the processing of each activity
- data flow operator, which represents an operation on the data inside the data flow
- work flow forms
- organizational structure In the following example of a business process, the introduced concepts will be reviewed in more detail. The exemplary business process is intended to send an email to a user. It uses a work flow form, where the user can select the addressee of the message and can enter an email body and person type, which is of one of types which are defined by the organizational structure 30. For the sake of simplicity, the examples provided herein are based on the notation provided by ARIS Process Automation Architect 7.2 (APAA). The above-described control flow 100 can be modeled as shown in FIG. 5.

The data flow 110 of the "human task" activity shown in FIG. 5 can be graphically represented as depicted in FIG. 6. However, the data flow of the separately standing, individual, activity "human task" is not very interesting when it comes to the question of interaction. For example, we need to send an email to the "Selected user" with the text from "E-mail body", respectively. It should be emphasized that the addressee and the text of the email will be entered during human interaction within the workflow form of the "human task" activity. Returning to the example, this requirement can be implemented by a data flow definition no for the "Notification" activity as it is shown in FIG. 7.

As can be seen in FIG. 7, the "Notification" activity data flow comprises the "Human task" activity data flow, the "Notification" activity dataflow itself, a concatenate operator and assignments. In other words, by using such building blocks, operations on data flows between activities of a business process can be modeled.

Translation of the Modeled Example into XML

In order to be able to translate the business process modeled in FIGS. 5-7 into the preferred XML form, first a definition of the basic concepts in the proposed XML schema will be described.

As a base abstraction for the business process, an XML schema complex type "process" is used:

```
<complexType name="process">
    <sequence>
        <element name="diagrams"
type="tns:diagrams" />
        <element name="dataflow"
type="tns:dataflow" />
        <element name="version" type="aris-
common:ARISModelVersion" />
        <element name="start-aform"
type="tns:guid" />
        <element name="name" type="string" />
        <element name="id" type="ID" />
        <element name="guid" type="tns:guid" />
    </sequence>
</complexType>
```

This complex type defines the following elements:

- diagrams—contains context information about the control flow 100 for a given business process
- dataflow—contains information about the dataflow 110 mapping for a given business process
- start-aform—contains start work flow form 20 for a given business process, where through user interaction additional information can be provided and will be used in other data flow(s) 20.

As a base abstraction for activities, events and gateways, an XML schema complex type "activity" is used:

```
<complexType name="activity">
    <sequence>
        <element name="id" type="ID" />
        <element name="guid" type="tns:guid" />
        <element name="occid" type="tns:guid" />
        <element name="name" type="string" />
        <element name="activityType"
type="string" />
        <element name="outgoing"
type="tns:connections" />
        <element name="incoming"
type="tns:connections" />
        <element name="attributes"
type="tns:attributes" />
        <element name="diagramRef"
type="tns:diagramRef" />
        <element name="dataFlowModel"
type="process:ActivityDataFlowModel" />
    </sequence>
</complexType>
```

As a base abstraction for connections, an XML schema complex type “connection” is used:

```
<complexType name="connection">
  <sequence>
    <element name="id" type="ID" />
    <element name="guid" type="tns:guid" />
    <element name="source" type="tns:guid" />
    <element name="target" type="tns:guid" />
  </sequence>
</complexType>
```

With the above-explained specific types of activities and connections, one may describe the control flow 100, specific types of activities and connections presented further below in Appendix 1.

As a base abstraction for the data flow 110, an XML schema complex type “dataflow” is used:

```
<complexType name="dataflow">
  <sequence>
    <element name="execution-context"
type="anyType" />
    <element name="mapping"
type="tns:mapping" maxOccurs="unbounded" />
    <element name="variable-catalogue"
type="tns:variable-catalogue" />
  </sequence>
</complexType>
```

This complex type defines the “execution-context”, “mapping” and “variable-catalogue” elements, respectively:

execution-context—contains context information for a given business process mapping—contains dataflow mapping for a given business process variable-catalogue—contains variables for a given business process As a base abstraction for the organizational structure 30, an XML schema complex type “organigram” is used:

```
<xs:complexType name="organigram">
  <xs:complexContent>
    <xs:extension base="tns:unit">
      <xs:sequence>
        <xs:element name="active" type="xs:boolean"/>
        <xs:element name="units" type="tns:orgUnits"/>
        <xs:element name="roles" type="tns:roles"/>
        <xs:element name="users" type="tns:users"/>
        <xs:element name="escalates"
type="tns:escalates"/>
      </xs:sequence>
    </xs:extension>
  </xs:complexContent>
</xs:complexType>
```

Figure 8:
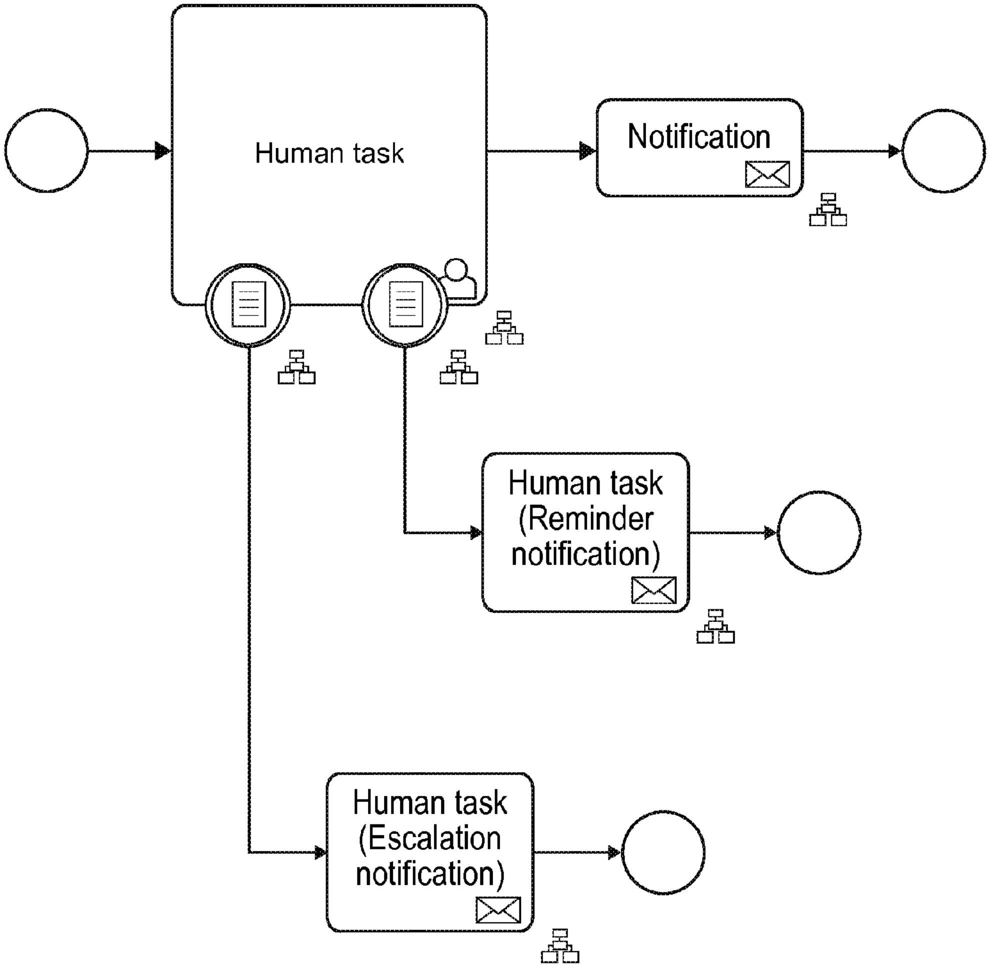

This complex type defines “units”, “roles”, “users” and “escalates” elements, respectively:

units—contains information about main organizational unit for a given business process roles—contains information about available roles for organizational unit for a given business process users—contains information about available users for given role for a given business process escalates—contains information about available escalate users for given organizational unit for a given business process It should be noted that in the above example, the technique of modeling business processes in the EPC (Event-driven process chain) notation is used. Since the proposed format of the invention is preferably based on a business process transformation in BPMN notation, there is a need for a transformation from EPC to the BPMN notation, which may be performed by applicant’s product ARIS Process Automation Architect (APAA). FIG. 8 shows an exemplary result of a transformation in BPMN notation. After a specified step is made, it becomes possible to keep the business process in the proposed format. An exemplary XML listing is provided further below in Appendix 2.

It will be appreciated that as used herein, the terms system, subsystem, server, client, programmed logic circuitry, and the like may be implemented as any suitable combination of software, hardware, firmware, and/or the like. It also will be appreciated that the storage locations herein may be any suitable combination of disk drive devices, memory locations, solid state drives, CD-ROMs, DVDs, tape backups, storage area network (SAN) systems, and/or any other appropriate non-transitory tangible computer readable storage medium. It also will be appreciated that the techniques described herein may be accomplished by having at least one processor execute instructions that may be tangibly stored on a non-transitory computer readable storage medium. Thus, for example, the systems of certain example embodiments may include, for instance, processing resources comprising at least one processor, a memory, etc. Similar statements apply with respect to the clients, servers, computing components, and/or other elements in the various networks discussed herein.

What is claimed is:

1. A method for deploying a process to a distributed network environment, wherein the process comprises a plurality of processing steps to be performed by a plurality of computing components of the distributed network environment, the method comprising:

a. generating an Extensible Markup Language (XML) process package that defines information needed to execute the process; and b. deploying the XML process package to the plurality of computing components;

c. wherein the XML process package comprises:

a control flow definition, comprising a definition of the plurality of processing steps and at least one connection between the plurality of processing steps; and a data flow definition, comprising a definition of at least one dataflow between the plurality of processing components.

2. The method of claim 1, wherein the control flow definition comprises a plurality of activity types for the plurality of processing steps selected from the group comprising: abstract activity, human task activity, web service activity, scripting activity, email activity, embedded sub-process and/or independent sub-process.

3. The method of claim 1, wherein the control flow definition comprises a definition of at least one event selected from the group comprising: start event, end event, cancel event, rule event, message event, intermediate event, terminate event, error event, timer event and/or link event.

4. The method of claim 1, wherein the control flow definition comprises a definition of at least one gateway selected from the group comprising: parallel gateway, synchronizer gateway and/or conditional gateway.

5. The method of claim 1, wherein the plurality of processing steps comprises a human task activity and wherein the control flow definition comprises a definition of a workflow form, the workflow form comprising at least one input element for inputting data into the workflow form to execute the human task activity.

6. The method of claim 1, wherein the plurality of processing steps comprises a web service activity and wherein the control flow definition comprises a web service address of the web service in charge of executing the web service activity.

7. The method of claim 1, wherein the definition of at least one dataflow between the plurality of processing components defined in the data flow definition comprises at least one dataflow operator, at least one source processing step of the dataflow, at least one target processing step of the dataflow, at least one constant and/or at least one variable.

8. The method of claim 1, wherein the plurality of processing steps comprises a human task activity and wherein the data flow definition comprises at least one definition selected from the group comprising: executor or group of executors of the human task activity, a reference to a workflow form, human workflow patterns, human task completion policies, human task scenarios, task throughput time and/or task priority.

9. The method of claim 1, wherein the plurality of processing steps comprises a web service activity and wherein the data flow definition comprises at least one definition selected from the group comprising: database name, database language, user login and/or password.

10. The method of claim 1, wherein the plurality of processing steps comprises an email activity and wherein the data flow definition comprises at least one definition selected from the group comprising: at least one recipient of the email, email subject and/or email body.

11. The method of claim 1, wherein the XML process package further comprises a definition of an organizational structure for executing the plurality of processing steps, wherein the organizational structure comprises at least one organizational unit, at least one role, at least one person, at least one relationship between the organizational units and/or at least one escalation manager.

12. The method of claim 1, further comprising:

exporting the XML process package from a first computing component of the plurality of computing components of the distributed network environment;

transmitting the XML process package to a second computing component of the plurality of computing components of the distributed network environment; and deploying the XML process package at the second computing component of the plurality of computing components of the distributed network environment.

13. A non-transitory computer readable storage medium tangibly storing a computer program comprising instructions for implementing a method in accordance with claim 1.

14. A system for deploying a process to a distributed network environment, wherein the process comprises a plurality of processing steps to be performed by a plurality of computing components of the distributed network environment, and wherein the system comprises:

a. a generator configured to generate an Extensible Markup Language (XML) process package that defines information needed to execute the process; and b. a deployment mechanism configured to deploy the XML process package to the plurality of computing components;

c. wherein the XML process package comprises:

a control flow definition, comprising a definition of the plurality of processing steps and at least one connection between the plurality of processing steps; and a data flow definition, comprising a definition of at least one dataflow between the plurality of processing components.

15. The system of claim 14, wherein the XML process package is exportable from a first computing component of the plurality of computing components of the distributed network environment, and transmittable to and deployable at a second computing component of the plurality of computing components of the distributed network environment.

16. The method of claim 1, wherein the XML process package is exportable from a first computing component of the plurality of computing components of the distributed network environment, and transmittable to and deployable at a second computing component of the plurality of computing components of the distributed network environment.

17. The method of claim 1, wherein the control flow definition and the data flow definition are separate from one another.

18. The system of claim 14, wherein the control flow definition and the data flow definition are separate from one another.

* * * * *